United States Patent [19]

Timpson, Jr. et al.

[11] Patent Number: 4,687,212
[45] Date of Patent: Aug. 18, 1987

[54] SEAL ASSEMBLY WITH STABILIZING RIBS

[75] Inventors: Alma A. Timpson, Jr., Sandy; Richard N. Rachal, Kearns, both of Utah

[73] Assignee: Baraw Corporation, Murray, Utah

[21] Appl. No.: 942,177

[22] Filed: Dec. 16, 1986

[51] Int. Cl.$^4$ ............................................. F16J 15/32
[52] U.S. Cl. .................................. 277/205; 277/165; 277/209
[58] Field of Search .......... 277/124, 165, 205, 207 R, 277/208–211, 212 R, 212 C

[56] References Cited

U.S. PATENT DOCUMENTS

| | | | |
|---|---|---|---|
| 3,149,848 | 9/1964 | Galloway | 277/165 |
| 3,418,001 | 6/1965 | Rentshler et al. | 277/165 |
| 3,727,925 | 4/1973 | Jones | 277/165 |
| 4,013,299 | 3/1977 | Scott | 277/165 |
| 4,193,606 | 3/1980 | Iverson | 277/205 |
| 4,244,192 | 1/1981 | Chellis | 277/205 |
| 4,328,972 | 5/1982 | Albertson et al. | 277/205 X |
| 4,577,874 | 3/1986 | Zitting | 277/165 |

Primary Examiner—Robert S. Ward
Attorney, Agent, or Firm—John R. Merkling

[57] ABSTRACT

An annular sealing ring with a generally Y-shaped cross-section for sealing between a piston and the curved wall of a cylinder. The sealing ring includes a base with one or more horizontal ribs extending outwardly from each side thereof and a pair of lips with sealing edges, the lips being spaced apart to form a cavity therebetween wherein a solid, elastic expander ring is retained. The cavity is bounded by the similarly opposed inner surface of the lips. The expander ring is seated in a portion of the cavity so that a void is created in the cavity below the expander ring.

10 Claims, 3 Drawing Figures

SEAL ASSEMBLY WITH STABILIZING RIBS

FIELD OF INVENTION

This invention relates generally to hydraulic seals and more particularly a novel two element seal having annular ribs for stabilizing the seal when in use, but reducing friction.

PRIOR ART

In the past, it has been common to provide two-part seals for hydraulic and pneumatic use, wherein the seal assembly comprises a generally Y-shaped cross-section having a pair of sealing lips with sealing edges extending sideways therefrom. An expander ring is typically retained in a cavity formed between the lips. The outwardly extending sealing lips are maintained in a correct orientation to provide a hydraulic or pneumatic seal by a stem which slidably engages neighboring machine part walls. To prevent the seal assembly from twisting, with resulting loss of sealing function, the stem portion of a seal is usually longer than the cross-section of the seal between the lips when the seal is in use. As a consequence of the relatively large surface area exposed to an adjacent wall, however, there is a corresponding increase in friction and wear.

BRIEF SUMMARY AND OBJECT OF THE INVENTION

The present invention provides for a sealing ring assembly with a generally Y-shaped cross-section having one or more horizontal ribs extending outwardly from each side of the stem and a pair of lips with sealing edges. The lips are spaced apart to form a cavity wherein a solid, elastomeric expander ring is retained. The expander ring is mounted in the center portion of the cavity so that a void is created in the cavity portion below the expander ring. The void area beneath the expander ring allows for lateral expansion and compression of the sealing ring. The void area further provides for compression of the sealing ring during installation and use, reducing the possibility that the ring assembly might disassemble under load conditions. In the alternative, a single element seal can also be used.

Annular rings are provided at or near the base of the stem, extending outwardly from the stem to engage adjacent machine part walls under load conditions. The annular rings stabilize the seal but reduce friction by minimizing the surface area presented to the adjacent wall. In addition, where more than one annular ring is provided, fluid is trapped between rings providing lubrication at the base of the seal, reducing friction and associated heat buildup.

With the foregoing in mind, it is an object of the present invention to provide a novel hydraulic or pneumatic seal comprising an efficient, two-element assembly.

A further important object of the present invention is to provide an annular, two-element seal assembly comprising a Y-shaped, double-apex, restricted contact sealing element and a spring element located within the Y of the sealing element.

It is an additional dominant object of the present invention to provide for friction-reducing rings for a one-element or a two-element seal for engaging the walls of adjacent machine parts from time to time.

It is a further principle object of the present invention to provide for the retention of fluid between adjacent annular elastomeric ridges for improved sealing and lubrication characteristics.

Another object of this invention is to provide a composite seal exhibiting improved stability with reduced friction losses.

DETAILED DESCRIPTION OF THE ILLUSTRATED EMBODIMENT

Figure 1:
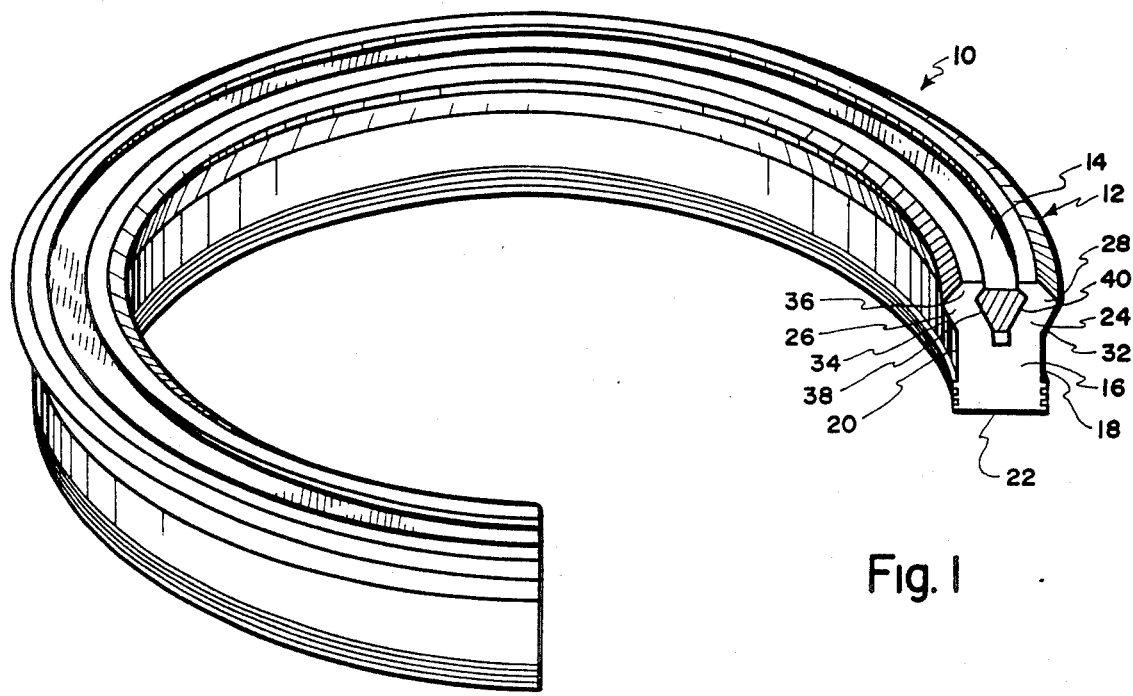
FIG. 1 is a broken isometric drawing of the composite seal made in accordance with the principles of this invention.

Reference is now made to the drawings wherein like numbers are used to designate like parts throughout. Referring now to FIG. 1, it will be understood that the composite seal, generally designated 10, comprises a boot 12 of generally Y-shaped configuration and an elastomeric resilient spring or expander 14. The boot 12 is of generally annular shape, but other shapes may be selected to conform to adjacent machine parts. The boot 12 comprises a base portion 16 defined by a generally planar outside surface 18, a radially inner annular side-surface 20, generally parallel to the outer surface 18 and a generally planar bottom surface 22. Extending upwardly from the base portion 16 is a bifurcated portion 24 comprising a pair of legs 26, 28 which define an annular generally v-shaped groove 30. The legs 26, 28 further comprise an exterior inclined radial side-surface 32 and an interior inclined radial side-surface 34, and a retention lip 36. As is apparent from FIG. 2, the side-surfaces 32, 34 diverge away from the base portion 16.

The v-shaped annular groove 30 provides an inclined radial inner side-surface 38 and an inclined radial outer side-surface 40 which generally converge toward the midline of the boot 12. The inclined surfaces 38, 40 terminate generally at a plane 42 defined by the juncture of the diverging side-surfaces 32, 34 with the parallel side-surfaces 18, 20. The groove 30 further comprises a channel 44 comprising a radial inner wall 46, a radial outer wall 48, and a bottom wall 50. The radial walls 46, 48 are generally parallel to each other and parallel to the side surfaces 18, 20.

The flexible elastomeric expander ring 14 is formed so that, when inserted into the v-shaped groove 30, the expander ring 14 will fill the groove 40 with the exception of the channel 44. Because the expander ring 14 does not occupy the channel 44 under normal conditions, a void area is created beneath the expander ring 14 which allows greater unit load on the sealing lips under certain conditions of lateral loading and allows greater distortion of the seal 10 during installation without disassembly of the seal 10. Compression of the legs 26, 28 radially inward toward the midline of the seal 10 forces the elastomeric expander ring 14 into channel 44 rather than out of the v-groove 30. This action reduces the risk that the seal parts 12, 14 would disassemble in use.

In the alternative, the seal 10 may comprise a single element ring as described above, but without the v-shaped annular groove 30 or the expander ring 14. Those skilled in the art will be able to adapt the principles of the present invention to various forms of seals without departing from the spirit of the invention.

The planar exterior surface 18 further comprises horizontal radial ribs 46, 48, and 50 which project outwardly from the side surface 18 to provide less drag for the composite seal 10.

Similarly, the inner surface 20 comprises radial rings 52, 54, and 56. Each outer ring is generally paired with an inner ring in a one-to-one fashion as, for example, ring 36 with ring 52, ring 48 with ring 54 and ring 50 with ring 56.

Figures 2, 3:
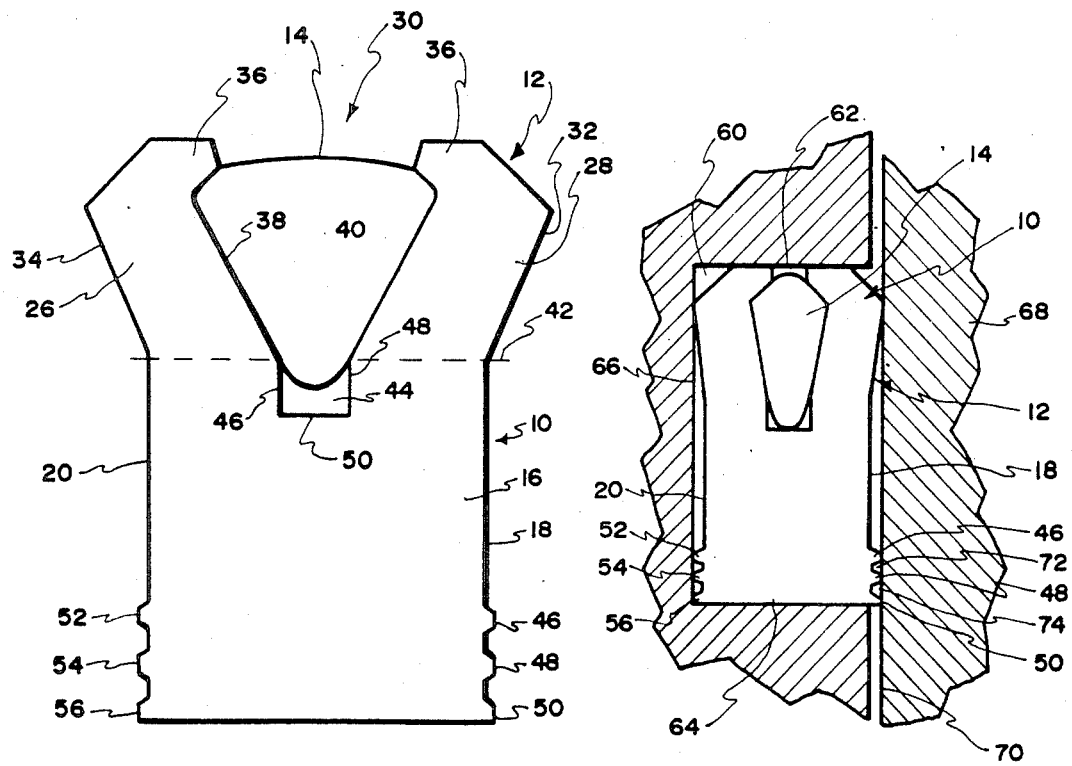
FIG. 2 is an enlarged cross-sectional view of a portion of a seal made in accordance with the present invention.
FIG. 3 is a cross-sectional view of a portion of a seal between two adjacent machine parts.

Referring now to FIG. 3, the seal 10 is illustrated in position in an annular groove 58 provided in a machinery part 60. The groove 60 comprises a pair of annular surfaces 62 and 64 and a sealing surface 66. The seal 10 engages a second machinery part 68 to provide a pressure seal between the parts 60, 68. The exterior rings, 46, 48, and 50, slidably engage a planar surface 70 of the second machine part 68, providing increased stability for the seal 10 and trapping fluid or lubricant in voids 72, 74 formed by the rings, the side wall 18 and the surface 70. The interior rings 52, 54, and 56 engage the sealing surface 66 of the first machine part 60 to maintain the annular orientation and force the external rings 46, 48, and 50 to engage the surface 70. In the preferred embodiment, the legs 26, 28 are compressed inwardly when the seal 10 is inserted between the machine the machine parts 60 and 68 so that the inclined surfaces 32, 34 press against the sealing surface 66 and the surface 70 with sufficient force to form a seal. The ribs 46 through 56 engage adjacent surfaces 66 or 70, but are not compressed against those surfaces to any significant extent. Since the ribs 46, 48, 50 present a minimal surface area to the surface 70 with a relatively small compressive force, the resulting coefficient of friction is low.

As is known in the art, the seal 10 may be made of a deformable but substantially non-compressable material, which may for instance comprise rubber, neoprene, urethane, or other suitable elastomeric or plastic material. The expander ring 14 should preferably comprise a deformable and slightly more compressable than the boot 12.

The invention may be embodied in other specific forms without departing from the spirit or essential characteristics thereof. The present embodiments are therefore considered in all respects as illustrative and not restrictive, the scope of the invention being indicated by the appended claims rather than by the foregoing description, and all changes that come within the meaning and range of equivalency of the claims are therefore intended to be embraced therein.

What is claimed and desired to be secured by United States Letters Patents is:

1. An annular sealing ring with a generally Y-shaped cross-section for sealing between a piston and a curved wall of a cylinder comprising a base, a pair of sealing lips for contact with said piston and said curved wall, and a solid, elastic expander ring;

said base having a generally rectilinear crosssection defined by a horizontal bottom surface, a pair of spaced vertical side surfaces extending upwardly from opposite ends of said horizontal bottom surface, and at least one horizontal rib projecting outwardly along each vertical side surface;

said pair of sealing lips spaced apart and extending from said base, each lip having a slanted side surface projecting upwardly and outwardly from one of said vertical side surfaces, a horizontal top surface extending inwardly from the top end of said slanted side surface whereby a sealing edge is formed by the intersection of said slanted side surface and said horizontal top surface;

said pair of lips also having corresponding, similarly opposed, inner surfaces including a first pair of slanted inner surfaces converging and extending downwardly from said horizontal top surfaces, a second pair of slanted inner surfaces diverging and extending downwardly from said first pair of slanted inner surfaces, a third pair of slanted inner surfaces converging and extending downwardly from said second pair of slanted inner surfaces, and a pair of vertical inner surfaces extending downwardly from said third pair of slanted inner surfaces and connecting to opposite ends of a horizontal inner surface, said inner surfaces forming the boundary of a cavity; and said solid, elastic expander ring being retained in said cavity by said second and said third pair of slanted inner surfaces, said ring having a generally truncated diamond-shaped cross-section, the top of said ring being more truncated than the bottom of said ring.

2. The annular ring assembly of claim 1 wherein said cavity is divided into a first portion bounded by said first pair of slanted inner surfaces, a second portion bounded by said second and said third pair of slanted inner surfaces, and a third portion bounded by said pair of vertical inner surfaces and said horizontal inner surface.

3. The annular ring assembly of claim 1 wherein said expander ring is retained in the second portion of said cavity.

4. The annular ring assembly of claim 1 wherein three horizontal and parallel ribs are evenly spaced and project outwardly along each verticle side surface.

5. A seal with a generally Y-shaped cross-section for sealing between two adjacent machine parts comprising a base, a pair of sealing lips for contact with said machine parts, and a solid, elastic expander ring;

said base having a generally rectilinear cross-section defined by a horizontal bottom surface, a pair of spaced vertical side surfaces extending upwardly from opposite ends of said horizontal bottom surface, and at least one horizontal rib projecting outwardly along each vertical side surface;

said pair of sealing lips spaced apart and extending from said base, each lip having a slanted side surface projecting upwardly and outwardly from one of said vertical side surfaces, a horizontal top surface extending inwardly from the top end of said slanted side surface whereby a sealing edge is formed by the intersection of said slanted side surface and said horizontal top surface;

said pair of lips also having corresponding, similarly opposed, inner surfaces including a first pair of slanted inner surfaces converging and extending downwardly from said horizontal top surfaces, a second pair of slanted inner surfaces diverging and extending downwardly from said first pair of slanted inner surfaces, a third pair of slanted inner surfaces converging and extending downwardly from said second pair of slanted inner surfaces, and a pair of vertical inner surfaces extending downwardly from said third pair of slanted inner surfaces and connecting to opposite ends of a horizontal inner surface, said inner surfaces forming the boundary of a cavity; and said solid, elastic expander being retained in said cavity by said second and said third pair of slanted inner surfaces, said expander having a generally truncated diamond-shaped cross-section, the top of said expander being more truncated than the bottom of said ring.

6. The seal assembly of claim 5 wherein said cavity is divided into a first portion bounded by said first pair of slanted inner surfaces, a second portion bounded by said second and said third pair of slanted inner surfaces, and a third portion bounded by said pair of vertical inner surfaces and said horizontal inner surface.

7. The seal assembly of claim 5 wherein said expander ring is retained in the second portion of said cavity.

8. The seal assembly of claim 5 wherein three horizontal and parallel ribs are evenly spaced and project outwardly along each vertical side surface.

9. A seal with a generally Y-shaped cross-section for sealing between two adjacent machine parts, and a pair of sealing lips for contact with said machine parts;

a base having a generally rectilinear cross-section defined by a horizontal bottom surface, a pair of spaced vertical side surfaces extending upwardly from opposite ends of said horizontal bottom surface, and at least one horizontal rib projecting outwardly along each vertical side surface;

said pair of sealing lips spaced apart and extending from said base, each lip having a slanted side surface projecting upwardly and outwardly from one of said vertical side surfaces, a horizontal top surface extending inwardly from the top end of said slanted side surface whereby a sealing edge is formed by the intersection of said slanted side surface and said horizontal top surface.

10. The seal of claim 9 wherein three horizontal and parallel ribs are evenly spaced and project outwardly along each vertical side surface.

* * * * *